(12) United States Patent  
Zhang et al.

(10) Patent No.: US 11,402,949 B2
(45) Date of Patent: Aug. 2, 2022

(54) DETECTION PANEL, DISPLAY APPARATUS, DRIVING METHOD AND MANUFACTURING METHOD FOR THE DETECTION PANEL

(71) Applicant: BOE Technology Group Co., Ltd., Beijing (CN)

(72) Inventors: Chenyang Zhang, Beijing (CN); Haisheng Wang, Beijing (CN); Yingming Liu, Beijing (CN); Xiufeng Li, Beijing (CN); Yanling Han, Beijing (CN); Yuzhen Guo, Beijing (CN); Lijun Zhao, Beijing (CN); Peixiao Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/254,971

(22) PCT Filed: Jun. 10, 2020

(86) PCT No.: PCT/CN2020/095367
§ 371 (c)(1),
(2) Date: Dec. 22, 2020

(87) PCT Pub. No.: WO2020/253590
PCT Pub. Date: Dec. 24, 2020

(65) Prior Publication Data
US 2021/0149510 A1 May 20, 2021

(30) Foreign Application Priority Data

Jun. 17, 2019 (CN) .......................... 201910521562.3

(51) Int. Cl.
*G06F 3/043* (2006.01)
*G06F 3/041* (2006.01)
*G06V 40/13* (2022.01)

(52) U.S. Cl.
CPC ............ *G06F 3/043* (2013.01); *G06F 3/0416* (2013.01); *G06V 40/1306* (2022.01); *G06F 2203/04103* (2013.01)

(58) Field of Classification Search
CPC ................... G06F 3/043; G06F 3/0416; G06F 2203/04106; G06F 3/0436; G06F 3/016;
(Continued)

(56) References Cited

U.S. PATENT DOCUMENTS 5,569,968 A 10/1996 Lal et al.
6,899,197 B2 * 5/2005 Arian .................. G01V 1/523
181/102

(Continued)

FOREIGN PATENT DOCUMENTS

CN 102265333 A 11/2011
CN 104552718 A 4/2015
(Continued)

OTHER PUBLICATIONS

First Office Action dated Jun. 3, 2020 for application No. CN201910521562.3 with English translation attached.
(Continued)

*Primary Examiner* — Olga V Merkoulova
(74) *Attorney, Agent, or Firm* — Nath, Goldberg & Meyer; Joshua B. Goldberg

(57) ABSTRACT

A detection panel, a display apparatus, a method for driving the detection panel, and a method for manufacturing the detection panel are provided. The detection panel includes an upper electrode layer, a piezoelectric material layer and a conductive backing layer which are sequentially stacked. The piezoelectric material layer is configured to change an electric field between the upper electrode layer and the conductive backing layer under an ultrasonic wave, and generate an ultrasonic wave under an electric field. The (Continued)

conductive backing layer includes a plurality of noise elimination members, and each of the noise elimination members has a dimension in a direction parallel to the detection panel that gradually decreases in a direction distal to the piezoelectric material layer.

19 Claims, 6 Drawing Sheets

(58) Field of Classification Search
CPC ........ G06F 3/0412; G06F 3/017; G06F 3/042; G06F 3/0418; G06F 3/044
See application file for complete search history.

(56) References Cited

U.S. PATENT DOCUMENTS

| | | | |
|---|---|---|---|
| 9,642,597 B2* | 5/2017 | Gu | G10K 11/02 |
| 10,886,310 B2* | 1/2021 | Guo | H01L 27/14665 |
| 2003/0029010 A1* | 2/2003 | Aime | G10K 11/002 |
| | | | 29/25.35 |
| 2005/0168941 A1* | 8/2005 | Sokol | H05K 7/20445 |
| | | | 361/688 |
| 2014/0354596 A1* | 12/2014 | Djordjev | G06F 3/0421 |
| | | | 345/175 |
| 2014/0355388 A1* | 12/2014 | Kent | H04R 17/00 |
| | | | 367/140 |
| 2015/0322768 A1 | 11/2015 | Lautzenhiser et al. | |
| 2018/0101711 A1* | 4/2018 | D'Souza | G06K 9/0002 |
| 2018/0290176 A1* | 10/2018 | Fukase | G01N 29/223 |
| 2019/0370519 A1* | 12/2019 | Kuo | B06B 1/0284 |

FOREIGN PATENT DOCUMENTS

| | | |
|---|---|---|
| CN | 106250834 A | 12/2016 |
| CN | 106824734 A | 6/2017 |
| CN | 207430654 U | 6/2018 |
| CN | 108924277 A | 11/2018 |
| CN | 109244108 A | 1/2019 |
| CN | 109633614 A | 4/2019 |
| CN | 109829419 A | 5/2019 |
| CN | 110201872 A | 9/2019 |
| JP | H04218765 A | 8/1992 |

OTHER PUBLICATIONS

Second Office Action dated Dec. 9, 2020 for application No. CN201910521562.3 with English translation attached.

* cited by examiner

DETECTION PANEL, DISPLAY APPARATUS, DRIVING METHOD AND MANUFACTURING METHOD FOR THE DETECTION PANEL

CROSS-REFERENCE TO RELATED APPLICATIONS

This is a National Phase Application filed under 35 U.S.C. 371 as a national stage of PCT/CN2020/095367, filed Jun. 10, 2020, an application claiming the benefit of Chinese Patent Application No. 201910521562.3, filed on Jun. 17, 2019 in the Chinese Intellectual Property Office, the content of each of which is incorporated herein by reference in its entirety.

TECHNICAL FIELD

The present disclosure relates to the field of ultrasonic detection, and in particular, to a detection panel, a display apparatus including the detection panel, a method for driving the detection panel, and a method for manufacturing the detection panel.

BACKGROUND

Ultrasonic detection is a detection method which utilizes a fact that an ultrasonic wave could penetrate through a material and echoes with different magnitudes may be generated due to different materials. In the ultrasonic detection, the ultrasonic wave is transmitted to an object which is to be detected, and a surface material and a shape of the object is detected based on echoes reflected from the surface of the object. An ultrasonic transducer is a common ultrasonic detection apparatus, which includes an upper electrode, a lower electrode and a piezoelectric material between the upper electrode and the lower electrode. A shape of the piezoelectric material is changed under an electric field between the upper electrode and the lower electrode to generate an ultrasonic wave, such that the piezoelectric material may emit an ultrasonic pulse.

In ultrasonic detection and ultrasonic diagnosis technology, echoes from a front surface (a surface proximal to an object to be detected) of the ultrasonic transducer are desired signals, and an interference noise reflected from a film layer on a back surface of the ultrasonic transducer may affect accuracy of the ultrasonic detection and thus needs to be eliminated. In the related art, in order to eliminate the interference noise from the back surface of the ultrasonic transducer, a backing block on the back surface of the ultrasonic transducer is generally designed to have a thickness as large as possible, such that sound energy emitted by the piezoelectric material toward the back surface of the ultrasonic transducer is almost completely dissipated in the backing block.

SUMMARY

According to one aspect of the present disclosure, a detection panel is provided. The detection panel includes an upper electrode layer, a piezoelectric material layer and a conductive backing layer which are sequentially stacked, wherein the piezoelectric material layer is configured to change an electric field between the upper electrode layer and the conductive backing layer under an ultrasonic wave received by the detection panel, and generate an ultrasonic wave under an electric field, wherein the conductive backing layer includes a plurality of noise elimination members, and each of the noise elimination members has a dimension in a direction parallel to the detection panel that gradually decreases in a direction away from the piezoelectric material layer.

In some embodiments, the plurality of noise elimination members are formed integrally as a single piece on a side proximal to the piezoelectric material layer.

In some embodiments, the conductive backing layer further includes a conductive substrate body between the piezoelectric material layer and the plurality of noise elimination members, and the plurality of noise elimination members are on a side of the conductive substrate body distal to the piezoelectric material layer.

In some embodiments, a cross section of the noise elimination member has a triangular shape in a direction perpendicular to the detection panel.

In some embodiments, the detection panel further includes an acoustic absorption backing layer on a side of the plurality of noise elimination members distal to the piezoelectric material layer, wherein the acoustic absorption backing layer fills and covers the plurality of noise elimination members.

In some embodiments, an acoustic impedance of the conductive substrate body is equal to an acoustic impedance of the plurality of noise elimination members, and is larger than an acoustic impedance of the piezoelectric material layer.

In some embodiments, a material of the conductive substrate body and the plurality of noise elimination members includes a conductive metal oxide and metal.

In some embodiments, the conductive metal oxide includes at least one of indium tin oxide and indium zinc oxide, and the metal includes at least one of silver, copper, iron and nickel.

In some embodiments, the conductive backing layer has a thickness in a range from 15 μm to 30 μm, and the conductive substrate body has a thickness in a range from 2 μm to 5 μm.

In some embodiments, a material of the acoustic absorption backing layer includes an epoxy resin, wherein the epoxy resin is doped with an impedance filler, the impedance filler includes at least one of tungsten, tungsten oxide, iron oxide, titanium dioxide, silicon dioxide, and talc, and the acoustic absorption backing layer has a thickness in a range from 15 μm to 30 μm.

In some embodiments, a material of the piezoelectric material layer includes at least one of polyvinylidene fluoride and polyvinylidene fluoride trifluoroethylene, and the piezoelectric material layer has a thickness in a range from 5 μm to 15 μm.

In some embodiments, the upper electrode layer includes a plurality of upper electrodes arranged in a plurality of rows and a plurality of columns, and the detection panel further includes an upper electrode driving circuit, and the upper electrode driving circuit is configured to receive electric signals for the plurality of upper electrodes row by row and output electric signals from the plurality of upper electrodes row by row.

In some embodiments, the upper electrode driving circuit includes a plurality of touch gate lines, a plurality of touch data lines, and a plurality of switching transistors in one-to-one correspondence with the plurality of upper electrodes, the plurality of touch gate lines and the plurality of touch data lines are in different layers, the plurality of touch gate lines and the plurality of touch data lines intersect to each other to divide the detection panel into a plurality of touch units arranged in a plurality of rows and a plurality of columns, and each of the plurality of touch units is provided with one upper electrode; each of the plurality of touch units is provided with one of the plurality of switching transistors and one of the plurality of upper electrodes, and a first electrode of each of the plurality of switching transistors is electrically coupled to a corresponding upper electrode; and gate electrodes of the switching transistors corresponding to the upper electrodes in a same row of touch units are electrically coupled to a same touch gate line, and second electrodes of the switching transistors corresponding to the upper electrodes in a same column of touch units are electrically coupled to a same touch data line.

In some embodiments, the detection panel further includes a touch base substrate, the upper electrode driving circuit is on the touch base substrate, and the touch base substrate, the upper electrode driving circuit, and the upper electrode layer are sequentially stacked in a thickness direction of the detection panel.

According to another aspect of the present disclosure, a detection method for biological characteristics by the above detection panel is provided, wherein the detection method for biological characteristics includes a plurality of detection periods, each of which includes a detection driving stage and a detection stage, the detection driving stage includes providing a first electric signal to a conductive backing layer and a second electric signal to a upper electrode layer, so as to enable a piezoelectric material layer to generate an ultrasonic wave; and the detection stage includes floating the conductive backing layer and stopping providing the second electric signal to the upper electrode layer, such that the piezoelectric material layer changes an electric field between the conductive backing layer and the upper electrode layer under a reflected ultrasonic wave; detecting an electric signal in the upper electrode layer; and determining biological characteristics based on the detected electric signal, wherein the biological characteristics include fingerprint morphology and/or a touch position.

According to another aspect of the present disclosure, a display apparatus is provided. The display apparatus includes a display panel and a detection panel, wherein the detection panel is above detection panel, the detection panel is on a backlight side of the display panel, and the display apparatus further includes a detection driving circuit and a biological characteristic detection circuit, the detection driving circuit is configured to, in a detection driving stage, provide a first electric signal to a conductive backing layer and provide a second electric signal to an upper electrode layer, so as to enable an piezoelectric material layer to generate an ultrasonic wave; and the biological characteristic detection circuit is configured to, in a detection stage, detect an electric signal in the upper electrode layer after floating the conductive backing layer and stopping providing the second electric signal to the upper electrode layer, and determine biological characteristics based on the detected electric signal, wherein the biological characteristics includes fingerprint morphology and/or a touch position.

In some embodiments, the display apparatus further includes an acoustic impedance matching layer between the display panel and the detection panel.

In some embodiments, an acoustic impedance of a material of the acoustic impedance matching layer is a geometric average of an acoustic impedance of a film layer of the display panel in contact with the acoustic impedance matching layer and an acoustic impedance of a film layer of the detection panel in contact with the acoustic impedance matching layer.

In some embodiments, the material of the acoustic impedance matching layer includes an epoxy resin, the epoxy resin is doped with an impedance filler, the impedance filler includes at least one of tungsten, tungsten oxide, iron oxide, titanium dioxide, silicon dioxide, and talc, and the acoustic impedance matching layer has a thickness of a quarter of a wavelength of an ultrasonic wave therethrough.

According to another aspect of the present disclosure, a method for manufacturing a detection panel is provided, the method includes: forming a pattern including an upper electrode layer on a touch base substrate; forming a piezoelectric material layer on the pattern including the upper electrode layer; and forming a conductive backing layer on the piezoelectric material layer, wherein the conductive backing layer includes a plurality of noise elimination members, and each of the noise elimination members has a dimension in a direction parallel to the detection panel that gradually decreases in a direction distal to the piezoelectric material layer.

BRIEF DESCRIPTION OF THE DRAWINGS

The accompanying drawings are used to provide a further understanding of the present disclosure and constitute a part of the specification, and are used to interpret the present disclosure together with the following specific embodiments, but do not constitute a limitation to the present disclosure. In the drawings.

DETAILED DESCRIPTION

The specific embodiments of the present disclosure will be described in detail below with reference to the accompanying drawings. It should be understood that the specific embodiments described herein are merely used to illustrate and explain the present disclosure, and are not used to limit the present disclosure.

In the related art, in order to eliminate interference noise from a back surface of an ultrasonic transducer, a backing layer block on the back surface of the ultrasonic transducer is generally designed for having a thickness as large as possible, such that sound energy emitted by a piezoelectric material toward the back surface of the ultrasonic transducer is almost completely dissipated in the backing layer block, which results in an excessive thickness of the ultrasonic transducer. Therefore, how to provide an ultrasonic transducer without an increased thickness while improving accuracy of ultrasonic detection, has become an urgent technical problem to be solved in the art.

Figure 1:
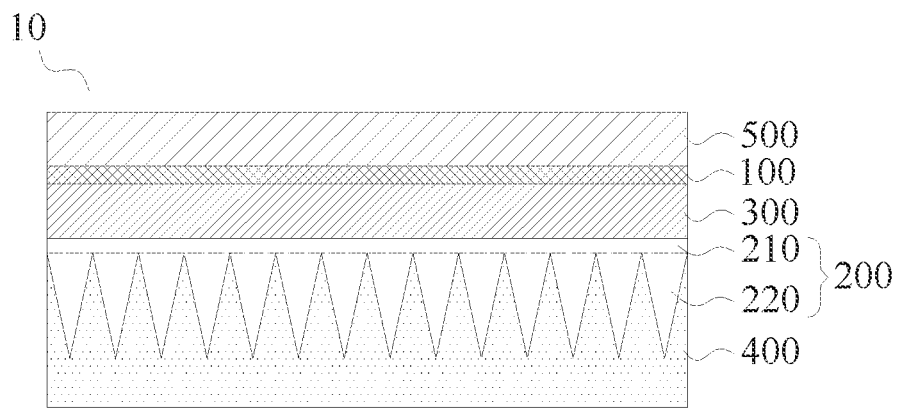
FIG. 1 is a schematic diagram of a structure of a detection panel according to an embodiment of the present disclosure.

To solve the above technical problem, a detection panel 10 is provided in the present disclosure. As shown in FIG. 1, the detection panel 10 includes an upper electrode layer 100, a piezoelectric material layer 300 and a conductive backing layer 200 sequentially stacked in a thickness direction (i.e., in a direction perpendicular to the detection panel 10). The piezoelectric material layer 300 is configured to change an electric field between the upper electrode layer 100 and the conductive backing layer 200 under an ultrasonic wave received by the detection panel 10, and the piezoelectric material layer 300 is further configured to generate an ultrasonic wave under an electric field. The conductive backing layer 200 includes a plurality of noise elimination members (portions) 220. The noise elimination members 220 each has a lateral dimension in a direction parallel to the detection panel 10 that gradually decreases in a direction away from the piezoelectric material layer 300.

Optionally, the plurality of noise elimination members 220 may be formed integrally as a single piece on a side proximal to the piezoelectric material layer 300, and may be used integrally as a lower electrode layer opposite to the upper electrode layer 100. The piezoelectric material layer 300 between the upper electrode layer 100 and the plurality of noise elimination members 220 formed integrally as a single piece may be caused to emit the ultrasonic wave by applying respective electric signals to the upper electrode layer 100 and the plurality of noise elimination members 220.

Optionally, the conductive backing layer 200 further includes a conductive substrate body 210 between the piezoelectric material layer 300 and the plurality of noise elimination members 220. The plurality of noise elimination members 220 are on a side of the conductive substrate body 210 distal to the piezoelectric material layer 300. The conductive substrate body 210 as a flat section of the conductive backing layer 200 may be in contact with the piezoelectric material layer 300, and may serve as the lower electrode layer. The conductive substrate body 210 and the plurality of noise elimination members 220 may be formed integrally as a single piece.

The detection panel 10 of the present disclosure may be used in cooperation with a display panel or other electronics. The detection panel 10 may be used to determine a touch position, and may further be used to determine fingerprint topography of a finger touching at least a part of the detection panel 10.

Figure 3:
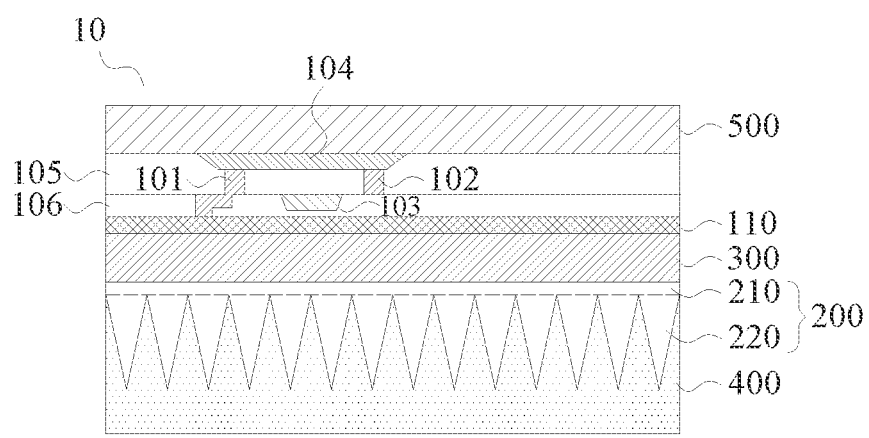
FIG. 3 is a schematic diagram of a detection panel according to an embodiment of the present disclosure.

It should be explained that, the upper electrode layer 100 may include at least one upper electrode. Optionally, as shown in FIG. 3, the upper electrode layer 100 may include a plurality of upper electrodes 110 arranged in a plurality of rows and a plurality of columns. An individual capacitor may be formed between each of the plurality of upper electrodes 110 and the conductive substrate body 210. When the ultrasonic wave reflected from the finger causes the piezoelectric material layer 300 to vibrate, different electric fields may be generated at different positions of the piezoelectric material layer 300 based on the reflected ultrasonic waves at respective positions, resulting in different potentials of respective upper electrodes 110. In this case, it is only required to detect a magnitude of the potential of each upper electrode 110, such that a touch position may be determined based on the position of the upper electrode 110 having a potential different from those of other upper electrodes 110, or a ridge and a valley of a fingerprint which respective upper electrodes 110 correspond to may be determined based on potential differences between the upper electrodes 110, thereby identifying the fingerprint.

Figure 9:
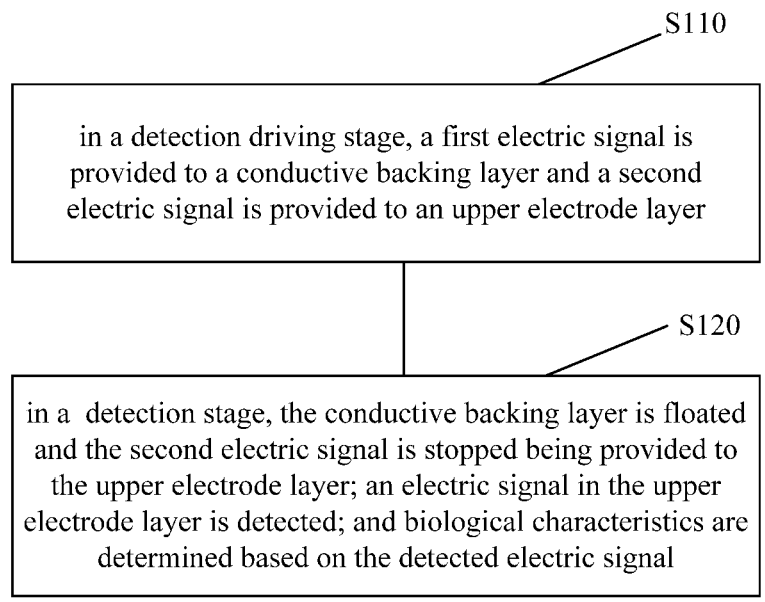
FIG. 9 is a flow chart of a detection method of a detection panel according to an embodiment of the present disclosure.

FIG. 9 is a flow chart of a detection method of a detection panel according to an embodiment of the present disclosure. As shown in FIG. 9, the detection method is a method for detecting biological characteristics. The detection method for biological characteristics includes a plurality of detection periods.

The following will describe briefly how the detection panel 10 implements the determination of the touch position.

The determination of the touch position includes two stages: a first stage as a detection driving stage, and a second stage as a detection stage.

In the detection driving stage, a finger covers the detection panel 10 (i.e., the upper electrode layer is between the finger and the conductive backing layer). Firstly, respective alternating voltage signals (i.e., first electric signals) are provided to the conductive backing layer of the detection panel 10, and the upper electrodes in the upper electrode layer 100 are grounded (i.e., are provided with a second electric signal), such that the detection panel 10 emits an initial ultrasonic wave upward (upward and downward directions herein refer to upward and downward in the drawings (a direction from the upper electrode layer 100 distal to the conductive backing layer 300 and a direction from the conductive backing layer 300 distal to the upper electrode layer 100), respectively). The initial ultrasonic wave is reflected at an interface where the finger is in contact with the detection panel 10 and at an interface where air is in contact with the detection panel 10, and then a reflected ultrasonic wave is generated. Since an acoustic impedance of air is generally much smaller than that of a material in the detection panel 10, the initial ultrasonic wave is almost totally reflected at the interface where the air is in contact with the detection panel 10 to generate the reflected ultrasonic wave. Since an acoustic impedance of the finger is closer to that of the material in the detection panel 10 than the air, a greater proportion of the initial ultrasonic wave may be incident to the finger at the interface where the finger is in contact with the detection panel 10. That is, an intensity of the reflected ultrasonic wave generated at the touch position is smaller than that generated at other positions.

In the detection stage, the conductive backing layer is floated, the second electric signal is stopped being provided to the upper electrode layer and signals generated by the upper electrodes 110 in the upper electrode layer are received. Since the reflected ultrasonic waves are re-propagated downward to the piezoelectric material layer 300 of the detection panel 10, the piezoelectric material layer 300 generates corresponding electric fields. It can be seen that an intensity of the electric field at the position touched by the finger is different from that at the position not touched by the finger, and therefore, signals output from the upper electrodes at the position touched by the finger are different from signals output from the upper electrodes 110 at the position not touched by the finger. The touch position may be determined based on an intensity of the signals output from the upper electrodes 110 at different positions.

The following will describe briefly how the detection panel 10 implements "the determination of the fingerprint topography".

The determination of the fingerprint topography also includes two stages: a first stage as a detection driving stage, and a second stage as a detection stage. In the detection driving stage, a finger tip covers the detection panel 10. Firstly, respective alternating voltage signals (i.e., first electric signals) are provided to the conductive backing layer of the detection panel 10, and the upper electrodes in the upper electrode layer 100 are grounded (i.e., a second electric signal is provided), such that the detection panel 10 emits an initial ultrasonic wave upward. Since the initial ultrasonic waves at the positions where the ridge of the finger fingerprint is located may be incident to the finger through the interface between the ridge of the finger fingerprint and the detection panel 10, and the initial ultrasonic waves at the positions where the valley of the finger fingerprint is located may hardly be incident to the air and is almost totally reflected to form the reflected ultrasonic wave, the reflected ultrasonic waves with different intensities are generated on an upper surface of the detection panel 10 at the positions where the ridge and the valley of the finger fingerprint are located.

In the detection stage, the conductive backing layer is floated, the second electric signal is stopped being provided to the upper electrode layer and signals generated by the upper electrodes 110 in the upper electrode layer 100 are received. Different reflected ultrasonic waves generated at the positions of the ridge and the valley of the finger fingerprint respectively are all propagated downward to different positions of the piezoelectric material layer 300 of the detection panel 10, such that corresponding electric fields are generated at different positions of the piezoelectric material layer 300. As can be seen from this, since an intensity of the electric fields at different positions of the piezoelectric material layer 300 corresponding to the position of the ridge of the finger fingerprint differs from an intensity of the electric fields at different positions of the piezoelectric material layer 300 corresponding to the position of the valley of the finger fingerprint, signals output from the upper electrodes 110 corresponding to the position of the ridge of the finger fingerprint differs from the signals output from the upper electrodes 110 corresponding to the position of the valley of the finger fingerprint. Based on potential difference between the upper electrodes 110, the ridge and the valley of the fingerprint which respective upper electrodes 110 correspond to may be determined based on potential differences between the upper electrodes 110, thereby identifying the fingerprint.

The following will describe how the noise elimination members in the conductive backing layer eliminate noise in order to improve detection accuracy.

The initial ultrasonic wave emitted upward by the detection panel 10 includes a first type of ultrasonic wave, a second type of ultrasonic wave and a third type of ultrasonic wave, wherein the first type of ultrasonic wave is generated by the piezoelectric material layer 300 and directly propagates upward, the second type of ultrasonic wave is emitted downward by the piezoelectric material layer 300 and is directly reflected upward by the conductive backing layer 200, and the third type of ultrasonic wave is emitted downward by the piezoelectric material layer 300, propagates downward through the conductive backing layer 200 and is reflected upward by a film layer under the conductive backing layer 200. Since the first type of ultrasonic wave and the second type of ultrasonic wave suffer less in refraction and reflection, and have neat and standard waveform, the first type of ultrasonic wave and the second type of ultrasonic wave may be used for ultrasonic touch function or identification of the fingerprint topography in the present disclosure, but the third type of ultrasonic wave is noise (i.e., noise which is required to be eliminated by the noise elimination members 220) harmful to the ultrasonic touch function in the present disclosure.

Figure 2:
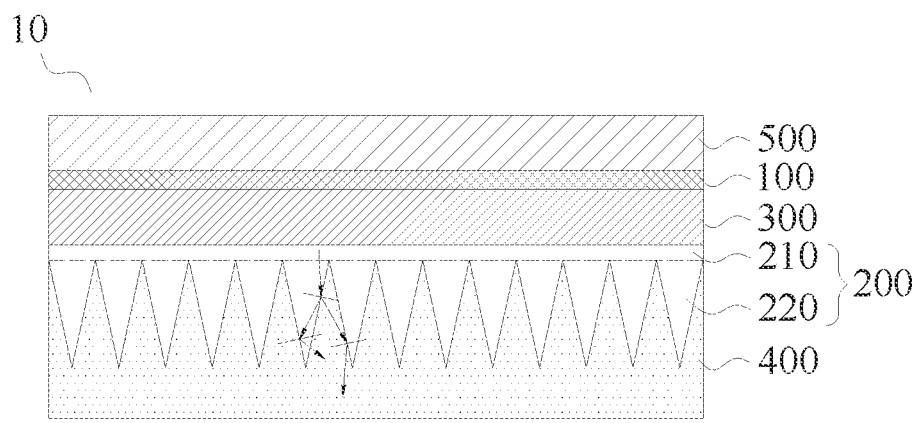
FIG. 2 is a functional schematic diagram of a detection panel according to an embodiment of the present disclosure.

In order to eliminate the third type of ultrasonic wave, in the present disclosure, the conductive backing layer 200 is provided with the conductive substrate body 210 and the plurality of noise elimination members 220 formed on the conductive substrate body 210. As shown in FIG. 1, a cross section of each of the noise elimination members 220 in a direction perpendicular to the detection panel 10 has a triangular shape. FIG. 2 is a schematic diagram illustrating an acoustic wave transmission path along which the third type of ultrasonic wave is reflected and refracted at an interface between the noise elimination members 220 and an adjacent film layer. Since the lateral dimension of the noise eliminating members 220 of the present disclosure is gradually reduced downward to form a plurality of wedge structures, the third type of ultrasonic wave (i.e. noise) is reflected and refracted many times at the interface between the noise eliminating members 220 and the adjacent film layer, and thus is attenuated, thereby effectively absorbing noise, avoiding the influence of noise on the ultrasonic touch function of the detection panel 10, and improving the accuracy of determination of the touch position and the accuracy of identification of the fingerprint topography.

In addition, since the detection panel 10 of the present disclosure may eliminate noise by the noise eliminating members 220, it is unnecessary to cause the conductive backing layer 200 and the film layer under the conductive backing layer 200 to have a too great thickness for increasing damping in a noise propagation, such that a thickness of the detection panel 10 may be effectively reduced, and a weight of the detection panel 10 may be reduced.

In order to increase a probability that the ultrasonic wave emitted downward from the piezoelectric material layer 300 are reflected by the conductive backing layer 200 to obtain the second type of ultrasonic wave, an acoustic impedance of a material of the conductive backing layer 200 is optionally greater than $1.5 \times 10^7$ pa*s/m. Optionally, an acoustic impedance of the conductive substrate body 210 is equal to that of the plurality of noise elimination members 220 and larger than that of the piezoelectric material layer 300. That is, the conductive substrate body 210 and the plurality of noise elimination members 220 may be made of a same material.

The thickness of the conductive backing layer 200 is not particularly limited in the present disclosure, and as a preferred embodiment of the present disclosure, optionally, the thickness of the conductive substrate body 210 is in a range from 2 μm to 5 μm, and the entire thickness of the conductive backing layer 200 is in a range from 15 μm to 30 μm.

The material of the conductive backing layer 200 is not particularly limited in the present disclosure, and as a preferred embodiment of the present disclosure, optionally, the material of the conductive backing layer 200 includes at least one of silver, copper, iron, and nickel, and the material of the conductive backing layer 200 may include conductive metal oxide, such as at least one of indium tin oxide and indium zinc oxide.

In order to secure the noise elimination function of the noise elimination members 220 while simplifying the process, optionally, as shown in FIG. 1, a longitudinal section of the noise elimination member 220 perpendicular to the detection panel 10 has a triangular shape. Optionally, the cross section of the noise elimination member 220 may have another shape, such as a trapezoid, such that the third type of ultrasonic wave is reflected and refracted many times at the interface between the noise eliminating members 220 and the adjacent film layer, and thus is attenuated.

Figure 4:
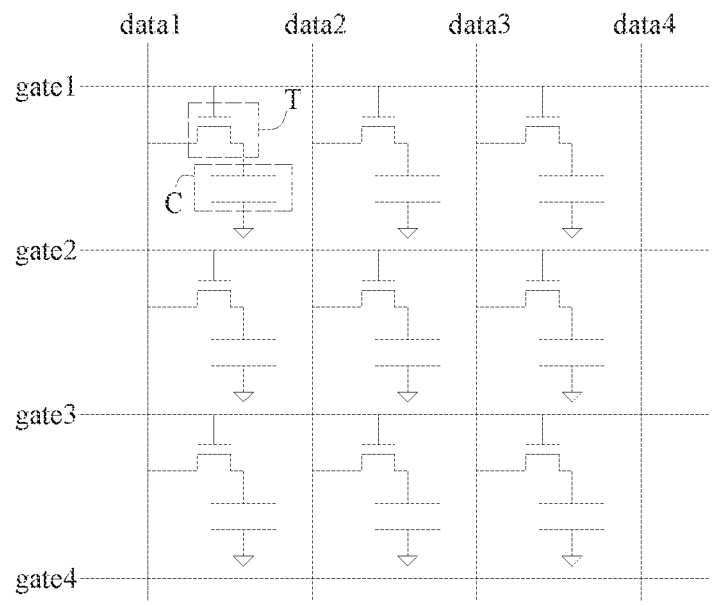
FIG. 4 is a schematic diagram showing a part of a circuitry of a detection panel according to an embodiment of the present disclosure.

The present disclosure does not specifically limit how the detection panel 10 is driven to sense the reflected ultrasonic wave, as long as values of the potentials at the respective electrodes 110 may be effectively obtained. For example, as an embodiment of the present disclosure, as shown in FIG. 4, the plurality of upper electrodes 110 are arranged in a plurality of rows and a plurality of columns. The detection panel 10 further includes an upper electrode driving circuit (module) for receiving electric signals generated by the plurality of upper electrodes 110 row by row and outputting the electric signals from the plurality of upper electrodes 110 row by row.

In the present disclosure, the upper electrodes 110 are arranged in an array of a plurality of rows and a plurality of columns. Different electric signals are generated by the upper electrodes 110 at respective positions due to the influence of the reflected ultrasonic wave. The upper electrode driving circuit receives the electric signals row by row, such that the reflected ultrasonic wave may be sensed.

To implement the receiving of the electric signals row by row, as shown in FIG. 4, the upper electrode driving circuit optionally includes a plurality of touch gate lines (gate 1, gate2, gate3, gate4 . . . ), a plurality of touch data lines (data 1, data2, data3, data4 . . . ), and a plurality of switching transistors T in one-to-one correspondence with the plurality of upper electrodes 110.

The touch gate lines and the touch data lines are in different layers, and intersect to each other to divide the detection panel 10 into a plurality of touch units arranged in a plurality of rows and a plurality of columns.

Each of the plurality of touch units is provided with a switching transistor T and an upper electrode 110. A first electrode of the switching transistor is electrically coupled to a corresponding upper electrode 110.

The plurality of upper electrodes are arranged in a plurality of rows and a plurality of columns. Gate electrodes of the switching transistors T corresponding to the upper electrodes 110 in a same row of touch units are electrically coupled to a same touch gate line, and second electrodes of the switching transistors T corresponding to the upper electrodes in a same column of touch units are electrically coupled to a same data line.

In the present disclosure, a shape and size of the upper electrode 110 are not particularly limited. The upper electrode 110 may have a shape of rectangle for ease of manufacturing. When the detection panel 10 provided by the present disclosure is used for fingerprint identification, optionally, each of the upper electrodes 110 has a side length in a range from 60 μm to 70 μm.

The first electrodes of the plurality of switching transistors T in the present disclosure are coupled to respective upper electrode 110. As shown in FIG. 4, an independent capacitor C is formed between the upper electrode 110 corresponding to each switching transistor T and the conductive substrate body 210. When the piezoelectric material layer 300 is influenced by the reflected ultrasonic wave, the charge amount in each capacitor C changes, such that the potential of each upper electrode 110 changes.

Each of the switching transistors T may be turned on under a control of the touch gate line, and then the potential at the respective upper electrode 110 may be conducted to the corresponding touch data line, such that the potentials at respective upper electrodes 110 in respective row may be sequentially obtained row by row, and sensing of the reflected ultrasonic wave from the entire surface is implemented.

The present disclosure does not specifically limit a structure of the switching transistor T, and for example, as shown in FIG. 3, the switching transistor T may include: a gate electrode 103, a source electrode 101, a drain electrode 102, and an active layer 104. The source electrode 101 is formed as a first electrode of the switching transistor T and the drain electrode 102 is formed as a second electrode of the switching transistor T. Optionally, the detection panel 10 may be provided with a gate insulating layer 105 and an insulating dielectric layer 106 for insulating the gate electrode 103, the source electrode 101 and the drain electrode 102 from the upper electrodes 110.

Figure 5:
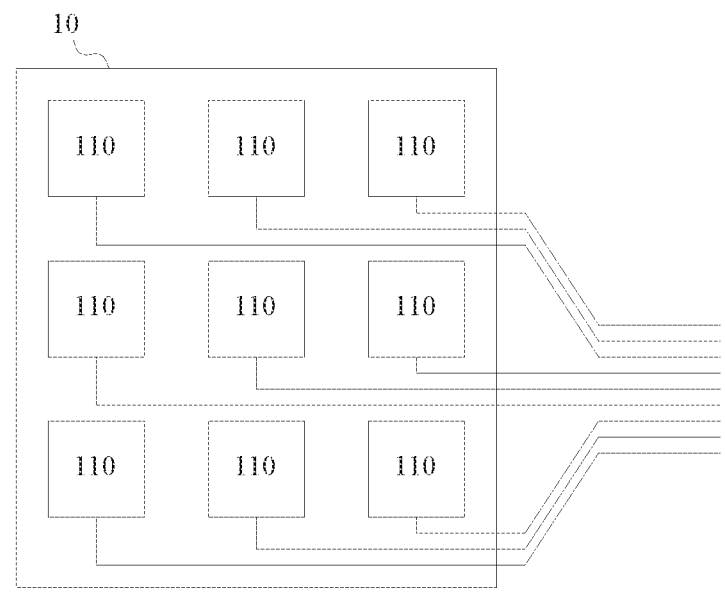
FIG. 5 is a schematic diagram showing a part of a circuitry of a detection panel according to an embodiment of the present disclosure.

The present disclosure does not specifically limit how the detection panel 10 is driven to emit the initial ultrasonic wave upward. In a case where the upper electrode layer 100 includes the plurality of upper electrodes 110, in order to simplify the circuit structure, as a preferred embodiment of the present disclosure, as shown in FIG. 5, the detection panel 10 further includes a sound driving circuit. The sound driving circuit includes an initial ultrasonic signal line coupled to the conductive backing layer 200 and a plurality of ground lines electrically coupled to the plurality of upper electrodes 110 in a one-to-one correspondence.

The initial ultrasonic signal line is configured to provide an alternating voltage signal (i.e., the first electric signal), corresponding to the electric field which enables the piezoelectric material layer 300 to generate the initial ultrasonic wave, to the conductive backing layer 200 and to provide a ground signal (i.e., the second electric signal) to the upper electrode layer, to enable the detection panel 10 to output the initial ultrasonic wave.

The ground line is configured to ground each upper electrode 110 when the initial ultrasonic wave is output from the detection panel 10.

In the detection driving stage, the alternating voltage signal is input to the conductive backing layer 200 through the initial ultrasonic signal line, and the ground line grounds each of the upper electrodes 110, such that an alternating electric field is formed between the conductive backing layer 200 and each of grounded upper electrodes 110, and the piezoelectric material layer emits an ultrasonic wave under the alternating electric field. In the detection stage, the conductive backing layer 200 is floated through the signal from the initial ultrasonic signal line, the upper electrodes 110 are stopped being grounded, and the upper electrodes output a signal corresponding to the reflected ultrasonic wave through the switching transistors T and a corresponding scanning circuit.

For convenience of manufacturing, optionally, the detection panel 10 further includes a touch base substrate 500 on which the upper electrode driving circuit is formed. The touch base substrate 500, the upper electrode driving circuit, and the upper electrode layer 100 are sequentially stacked in a thickness direction of the detection panel 10. Optionally, the touch base substrate 500 may be made of glass.

To enhance the elimination of noise, optionally, the detection panel 10 may further include an acoustic absorption backing layer 400 on a side of the conductive backing layer 200 distal to the piezoelectric material layer 300, and the acoustic absorption backing layer 400 covers a surface of the conductive backing layer 200. A material of the acoustic absorption backing layer 400 is capable of absorbing the ultrasonic wave.

The material of the acoustic absorption backing layer 400 is not particularly limited in the present disclosure, and as a preferred embodiment of the present disclosure, the material of the acoustic absorption backing layer 400 includes an epoxy resin doped with impedance filler.

It should be noted, the impedance filler is used to adjust an acoustic attenuation coefficient of the acoustic absorption backing layer 400 and to increase an acoustic impedance of the acoustic absorption backing layer 400. The impedance filler is not particularly limited in the present disclosure, and as a preferred embodiment of the present disclosure, the impedance filler includes at least one of tungsten, tungsten oxide, iron oxide, titanium dioxide, silicon dioxide, and talc.

A thickness of the acoustic absorption backing layer 400 is not particularly limited in the present disclosure, and as a preferred embodiment of the present disclosure, the acoustic absorption backing layer 400 has a thickness in a range from 15 µm to 30 µm.

The lateral dimension of the noise elimination member 220 of the present disclosure gradually decreases in a direction distal to the piezoelectric material layer to form the plurality of wedge structures, such that the noise is reflected and refracted many times at the interface between the noise eliminating member 220 and the acoustic absorption backing layer 40, and most noise is incident into the acoustic absorption backing layer 400 or attenuates in multiple reflection and refraction, thereby absorbing the noise effectively, preventing the noise from being reflected back into the piezoelectric material layer 300, and preventing the touch function of the detection panel 10 from being the influenced.

A material of the piezoelectric material layer 300 is not particularly limited by the present disclosure, and as a preferred embodiment of the present disclosure, the material of the piezoelectric material layer 300 includes at least one of polyvinylidene fluoride and polyvinylidene fluoride trifluoroethylene. The piezoelectric material layer may be obtained by only two simple processes, such as coating and curing, and thus, the difficulty in manufacturing the piezoelectric material layer 300 may be effectively reduced by using polyvinylidene fluoride and polyvinylidene fluoride trifluoroethylene.

A thickness of the piezoelectric material layer 300 is not particularly limited in the present disclosure, and as a preferred embodiment of the present disclosure, the thickness of the piezoelectric material layer 300 is in a range from 5 µm to 15 µm.

The detection panel 10 of the present disclosure not only may realize a fingerprint recognition function alone, but also may form a display apparatus with a touch function together with a display panel.

As a second aspect of the present disclosure, a detection method for biological characteristics by using the detection panel 10 described in the previous embodiment is provided. The detection method for biological characteristics includes a plurality of detection periods, each of which includes two stages. FIG. 9 is a flowchart of a detection method of the detection panel according to an embodiment of the present disclosure. At S110, in the detection driving stage, the first electric signal is provided to the conductive backing layer 200 and the second electric signal is provided to the upper electrode layer, such that the piezoelectric material layer 300 may generate the ultrasonic wave. At S120, in the detection stage, the conductive backing layer 200 is floated and the second electric signal is stopped being provided to the upper electrode layer, such that the piezoelectric material layer 300 changes the electric field between the conductive backing layer 200 and the upper electrode layer 100 under the reflected ultrasonic wave; an electric signal in the upper electrode layer 100 is detected; and the biological characteristics are determined based on the detected electric signal. The biological characteristics include fingerprint topography and/or the touch position.

In the present disclosure, the detection panel 10 is configured to emit the initial ultrasonic wave to a finger in the detection driving stage of each detection period, and then, to receive the electric signal generated by the upper electrode layer 100 in the detection stage, thereby implementing the detection for the biological characteristics by the detection panel 10.

Figure 6:
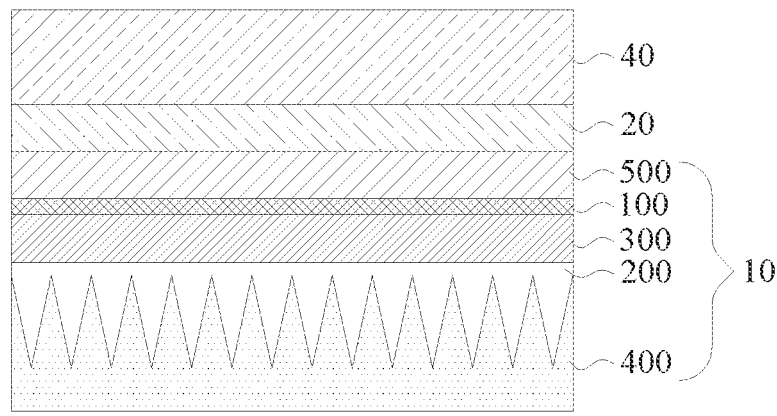
FIG. 6 is a schematic diagram of a structure of a display apparatus according to an embodiment of the present disclosure.

As a third aspect of the present disclosure, a display apparatus including the display panel and the detection panel is provided. As shown in FIG. 6, the detection panel is the detection panel 10 described above, and the detection panel 10 is on a backlight side of the display panel 20.

Figure 8:
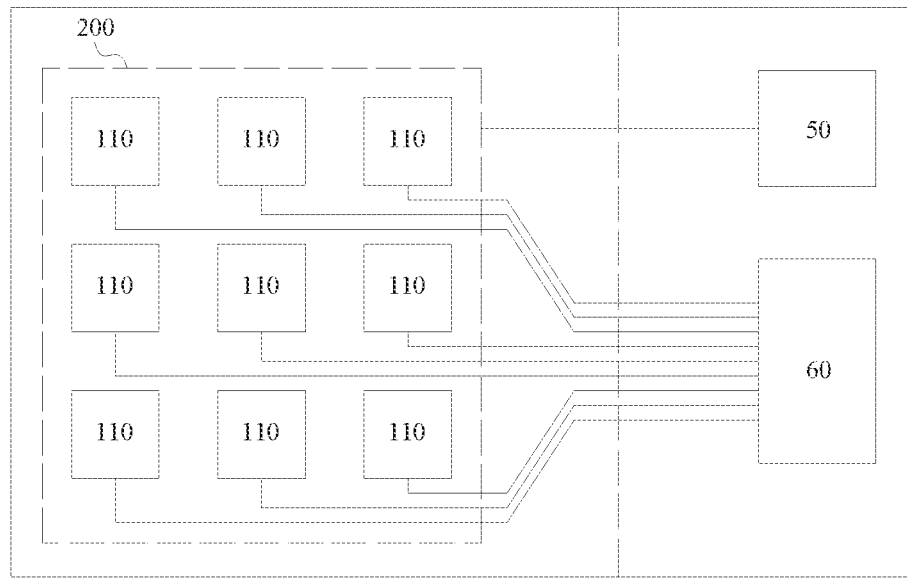
FIG. 8 is a schematic diagram showing a part of a circuitry of a display apparatus according to an embodiment of the present disclosure.

As shown in FIG. 8, the display apparatus further includes a detection driving circuit 50 and a biological characteristic detection circuit 60. The detection driving circuit 50 is configured to provide the first electric signal to the conductive backing layer 200 and the second electric signal to the upper electrode layer in the detection driving stage, such that the piezoelectric material layer 300 generates the ultrasonic wave. The biological characteristic detection circuit 60 is configured to detect the electric signal in the upper electrode layer 100 in the detection stage after the conductive backing layer 200 is floated and the second electric signal is stopped being provided to the upper electrode layer, and to determine the biometric characteristics based on the detected electric signal. The biometric characteristics include fingerprint topography and/or the touch position.

The backlight side described herein refers to a side opposite to a light outgoing side of the display panel.

In the display apparatus, the display panel 20 may be an organic light emitting diode display panel or a liquid crystal display panel. The detection panel 10 of the present disclosure utilizes the ultrasonic wave principle to implement identification of a fingerprint on a screen or a screen touch, without affecting the normal display of the display panel 20.

In addition, since the detection panel 10 of the present disclosure may eliminate noise by using the noise eliminating member 220, damping of noise propagation may be increased in a case where it is only necessarily to provide a film layer with a smaller thickness under the conductive backing layer 200, or even in a case where it is unnecessarily to provide the film layer under the conductive backing layer 200, thereby effectively reducing entire thickness of the display apparatus, reducing total weight of the display apparatus, and realizing lightness and thinness of a product.

Optionally, the detection driving circuit 50 and the biological characteristic detection circuit 60 are both in a bonding region of the display apparatus.

Figure 7:
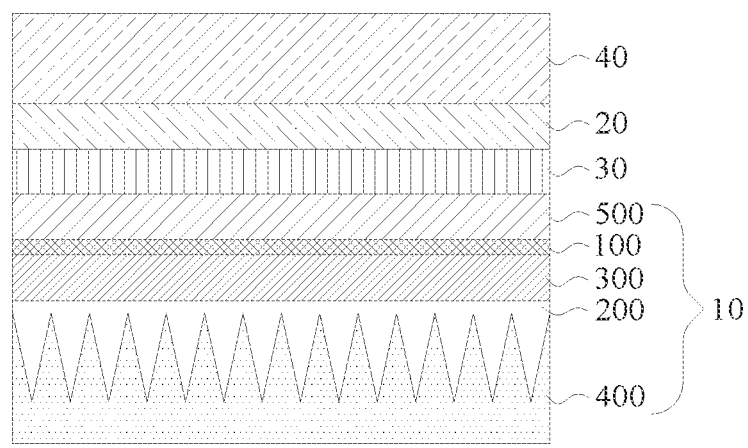
FIG. 7 is a schematic diagram of a structure of a display apparatus according to an embodiment of the present disclosure.

In order to improve propagation efficiency of the initial ultrasonic wave, optionally, as shown in FIG. 7, the display apparatus further includes an acoustic impedance matching layer 30 between the display panel 20 and the detection panel 10.

In the display apparatus provided by the present disclosure, the acoustic impedance matching layer 30 is provided between the display panel 20 and the detection panel 10, which prevents the reflection of the ultrasonic wave at the interface between the display panel 20 and the detection panel 10 due to acoustic impedance difference between film layers where the display panel 20 and the detection panel 10 are in contact with each other, thereby improving the propagation efficiency of the initial ultrasonic wave.

To maximize the propagation efficiency of the initial ultrasonic wave, optionally, the acoustic impedance of a material of the acoustic impedance matching layer 30 is a geometric average of an acoustic impedance of a film layer of the display panel 20 in contact with the acoustic impedance matching layer and an acoustic impedance of a film layer of the detection panel 10 in contact with the acoustic impedance matching layer.

The material of the acoustic impedance matching layer 30 is not particularly limited by the present disclosure, and as a preferred embodiment of the present disclosure, the material of the acoustic impedance matching layer 30 includes epoxy resin doped with filler, and the filler includes at least one of tungsten, tungsten oxide, iron oxide, titanium dioxide, silicon dioxide, and talc.

A thickness of the acoustic impedance matching layer 30 is not particularly limited in the present disclosure, and as a preferred embodiment of the present disclosure, the thickness of the acoustic impedance matching layer 30 is one quarter of the wavelength of the ultrasonic wave emitted from the detection panel 10.

In order to implement the touch recognition function of the detection panel 10, optionally, the display apparatus further includes a detection control unit configured to determine a touch position and/or fingerprint topography based on the electric signal received from the upper electrodes through the touch data line of the detection panel 10.

In order to enhance strength of the display apparatus and protect light emitting elements in the display apparatus, optionally, the display apparatus further includes an upper cover plate 40 which may be made of glass.

Figure 10:
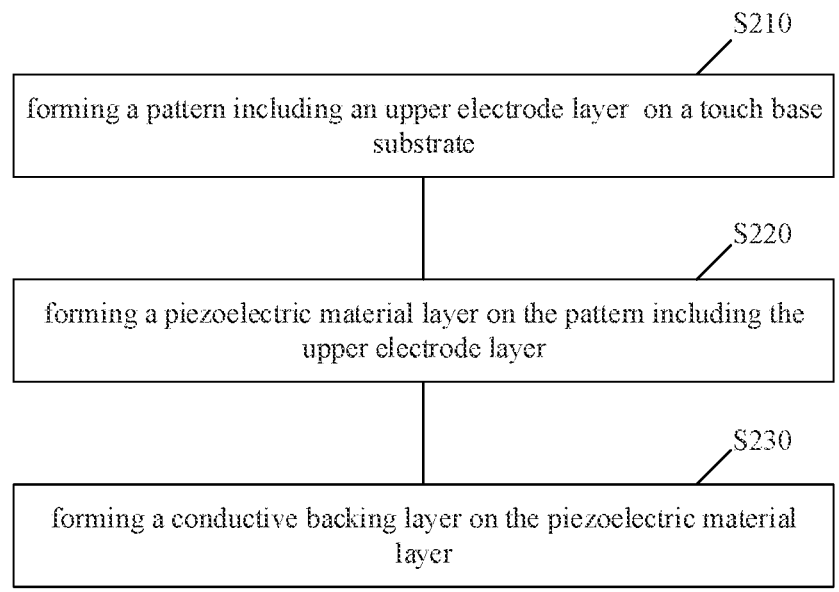
FIG. 10 is a flow chart of a method for manufacturing a detection panel according to an embodiment of the present disclosure.
Figure 11:
FIG. 11 is a schematic diagram showing a detection panel in one step of a method for manufacturing the detection panel according to an embodiment of the present disclosure.
Figure 12:
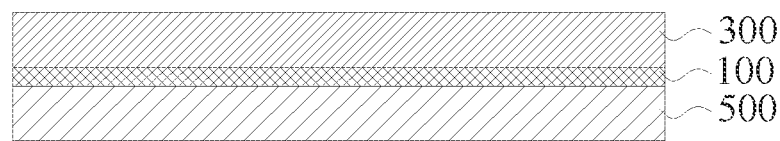
FIG. 12 is a schematic diagram showing a detection panel in one step of a method for manufacturing the detection panel according to an embodiment of the present disclosure.
Figure 13:
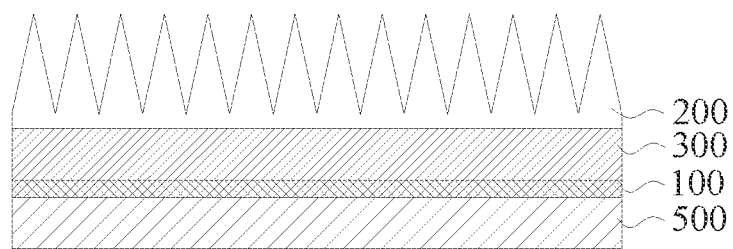
FIG. 13 is a schematic diagram showing a detection panel in one step of a method for manufacturing the detection panel according to an embodiment of the present disclosure.
Figure 14:
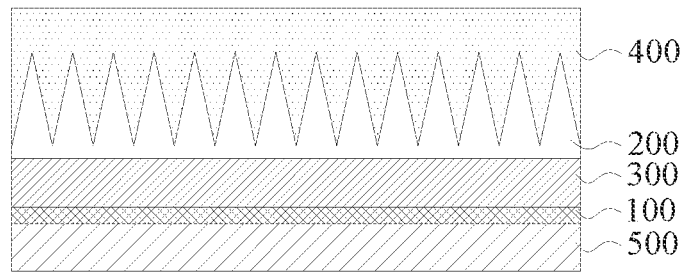
FIG. 14 is a schematic diagram showing a detection panel in one step of a method for manufacturing the detection panel according to an embodiment of the present disclosure.

As a fourth aspect of the present disclosure, a method for manufacturing the detection panel 10 is also provided. FIG. 10 is a flowchart of a method for manufacturing the detection panel according to an embodiment of the present disclosure, and FIGS. 11 to 14 are cross-sectional views of the detection panel in respective steps. As shown in FIG. 10, the method for manufacturing the detection panel includes the following steps S210 to S230.

At S210, a pattern including the upper electrode layer 100 is formed on the touch base substrate 5X).

At S220, the piezoelectric material layer 300 is formed on the pattern including the upper electrode layer.

At S230, the conductive backing layer 200 is formed on the piezoelectric material layer. The conductive backing layer 200 includes the plurality of noise elimination members 220. The noise elimination members 220 each has the lateral dimension in the direction parallel to the detection panel that gradually decreases in the direction distal to the piezoelectric material layer 300. The conductive backing layer 200 further includes the conductive substrate body 210 between the piezoelectric material layer 300 and the plurality of noise elimination members 220. The plurality of noise elimination members 220 are on a side of the conductive substrate body 210 distal to the piezoelectric material layer 300. The conductive substrate body 210 as a flat section of the conductive backing layer 200 may be in contact with the piezoelectric material layer 300 and may serve as a lower electrode layer. The conductive substrate body 210 and the plurality of noise elimination members 220 may be integrally formed as a single piece.

The detection panel 10 manufactured by the above method includes the noise elimination members 220, and noise may be reflected and refracted many times at the interface between the noise elimination members 220 and an adjacent film layer, and thus is attenuated, such that the noise is effectively absorbed, and the influence of the noise on the ultrasonic touch function of the detection panel 10 is avoided.

In addition, since the detection panel 10 of the present disclosure may eliminate noise by using the noise elimination members 220, it is unnecessary to cause the conductive backing layer 200 and the film layer under the conductive backing layer 200 to have a too great thickness for increasing damping in a noise propagation, such that a thickness of the detection panel 10 may be effectively reduced, and a weight of the detection panel 10 may be reduced.

To enhance the noise elimination, optionally, the method of manufacturing the detection panel further includes forming the acoustic absorption backing layer 400 after forming the conductive backing layer 200.

Optionally, a material of the acoustic absorption backing layer 400 may include epoxy resin doped with impedance filler, and the acoustic absorption backing layer 400 is formed by a thermo compression curing method.

Optionally, the method of forming the conductive backing layer 200 may include any one of an imprinting process, an etching process, and a screen printing process.

Optionally, the method for manufacturing the detection panel 10 further includes forming the upper electrode driving circuit before manufacturing the upper electrode layer 100 on a back panel base substrate. The upper electrode driving circuit includes the plurality of touch gate lines (gate1, gate2, gate3, gate4 . . . ), the plurality of touch data lines (data1, data2, data3, data4 . . . ), and the plurality of switching transistors T in one-to-one correspondence with the plurality of upper electrodes 110.

The plurality of touch gate lines and the plurality of touch data lines are in different layers, and the plurality of touch gate lines and the plurality of touch data lines intersect to each other to divide the detection panel 10 into the plurality of touch units. Each of the plurality of touch units is provided with one switching transistor T and one upper electrode 110, and a first electrode of the switching transistor is electrically coupled to the corresponding upper electrode 110. The plurality of upper electrodes is arranged in a plurality of rows and a plurality of columns. Gate electrodes of the switching transistors T corresponding to the upper electrodes 110 in a same row of touch units are electrically coupled to a same touch gate line, and second electrodes of the switching transistors T corresponding to the upper electrodes in a same column of touch units are electrically coupled to a same data line.

It should be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

What is claimed is:

1. A detection panel, comprising an upper electrode layer, a piezoelectric material layer and a conductive backing layer which are sequentially stacked, wherein
the piezoelectric material layer is configured to change an electric field between the upper electrode layer and the conductive backing layer under an ultrasonic wave received by the detection panel, and to generate an ultrasonic wave under an electric field; and
the conductive backing layer comprises a plurality of noise elimination members, each of which has a dimension in a direction parallel to the detection panel that gradually decreases in a direction away from the piezoelectric material layer,
the detection panel further comprises an acoustic absorption backing layer on a side of the plurality of noise elimination members distal to the piezoelectric material layer, wherein the acoustic absorption backing layer as a single component fills and covers the plurality of noise elimination members.

2. The detection panel according to claim 1, wherein the plurality of noise elimination members are formed integrally as a single piece on a side proximal to the piezoelectric material layer.

3. The detection panel according to claim 2, wherein the conductive backing layer further comprises a conductive substrate body between the piezoelectric material layer and the plurality of noise elimination members, and the plurality of noise elimination members are on a side of the conductive substrate body distal to the piezoelectric material layer.

4. The detection panel according to claim 3, wherein a cross section of the noise elimination member has a triangular shape in a direction perpendicular to the detection panel.

5. The detection panel according to claim 3, wherein an acoustic impedance of the conductive substrate body is equal to an acoustic impedance of the plurality of noise elimination members, and is larger than an acoustic impedance of the piezoelectric material layer.

6. The detection panel according to claim 5, wherein a material of the conductive substrate body and the plurality of noise elimination members comprises a conductive metal oxide and metal.

7. The detection panel according to claim 6, wherein the conductive metal oxide comprises at least one of indium tin oxide and indium zinc oxide, and
the metal comprises at least one of silver, copper, iron and nickel.

8. The detection panel according to claim 7, wherein the conductive backing layer has a thickness in a range from 15 µm to 30 µm, and the conductive substrate body has a thickness in a range from 2 µm to 5 µm.

9. The detection panel according to claim 5, wherein a material of the acoustic absorption backing layer comprises an epoxy resin, the epoxy resin is doped with an impedance filler, the impedance filler comprises at least one of tungsten, tungsten oxide, iron oxide, titanium dioxide, silicon dioxide, and talc, and the acoustic absorption backing layer has a thickness in a range from 15 µm to 30 µm.

10. The detection panel according to claim 1, wherein a material of the piezoelectric material layer comprises at least one of polyvinylidene fluoride and polyvinylidene fluoride trifluoroethylene, and the piezoelectric material layer has a thickness in a range from 5 µm to 15 µm.

11. The detection panel according to claim 1, wherein the upper electrode layer comprises a plurality of upper electrodes in a plurality of rows and a plurality of columns, and
the detection panel further comprises an upper electrode driving circuit, and the upper electrode driving circuit is configured to receive electric signals for the plurality of upper electrodes row by row and output electric signals from the plurality of upper electrodes row by row.

12. The detection panel according to claim 11, wherein the upper electrode driving circuit comprises a plurality of touch gate lines, a plurality of touch data lines, and a plurality of switching transistors in one-to-one correspondence with the plurality of upper electrodes,
the plurality of touch gate lines and the plurality of touch data lines are in different layers, the plurality of touch gate lines and the plurality of touch data lines intersect to each other to divide the detection panel into a plurality of touch units in a plurality of rows and a plurality of columns, and each of the plurality of touch units is provided with one upper electrode;
each of the plurality of touch units is provided with one of the plurality of switching transistors and one of the plurality of upper electrodes, and a first electrode of each of the plurality of switching transistors is electrically coupled to a corresponding upper electrode; and
gate electrodes of the switching transistors corresponding to the upper electrodes in a same row of touch units are electrically coupled to a same touch gate line, and second electrodes of the switching transistors corresponding to the upper electrodes in a same column of touch units are electrically coupled to a same touch data line.

13. The detection panel according to claim 12, wherein the detection panel further comprises a touch base substrate, the upper electrode driving circuit is on the touch base substrate, and the touch base substrate, the upper electrode driving circuit, and the upper electrode layer are sequentially stacked in a thickness direction of the detection panel.

14. A detection method for biological characteristics by the detection panel of claim 1, wherein the detection method for biological characteristics comprises a plurality of detection periods, each of which comprises a detection driving stage and a detection stage, wherein
the detection driving stage comprises providing a first electric signal to the conductive backing layer and providing a second electric signal to the upper electrode layer, so as to enable the piezoelectric material layer to generate an ultrasonic wave; and
the detection stage comprises floating the conductive backing layer and stopping providing the second electric signal to the upper electrode layer, such that the piezoelectric material layer changes an electric field between the conductive backing layer and the upper electrode layer under a reflected ultrasonic wave; detecting an electric signal in the upper electrode layer; and determining biological characteristics based on the detected electric signal, wherein the biological characteristics comprise fingerprint morphology and/or a touch position.

15. A display apparatus, comprising a display panel and a detection panel, wherein the detection panel is a detection panel according to claim 1, the detection panel is on a backlight side of the display panel, and the display apparatus further comprises a detection driving circuit and a biological characteristic detection circuit, the detection driving circuit is configured to, in a detection driving stage, provide a first electric signal to the conductive backing layer and provide a second electric signal to the upper electrode layer, so as to enable the piezoelectric material layer to generate an ultrasonic wave; and the biological characteristic detection circuit is configured to, in a detection stage, detect an electric signal in the upper electrode layer after floating the conductive backing layer and stopping providing the second electric signal to the upper electrode layer, and determine biological characteristics based on the detected electric signal, wherein the biological characteristics comprise fingerprint morphology and/or a touch position.

16. The display apparatus according to claim 15, further comprising an acoustic impedance matching layer between the display panel and the detection panel.

17. The display apparatus according to claim 16, wherein an acoustic impedance of a material of the acoustic impedance matching layer is a geometric average of an acoustic impedance of a film layer of the display panel in contact with the acoustic impedance matching layer and an acoustic impedance of a film layer of the detection panel in contact with the acoustic impedance matching layer.

18. The display apparatus according to claim 16, wherein the material of the acoustic impedance matching layer comprises an epoxy resin, the epoxy resin is doped with an impedance filler, the impedance filler comprises at least one of tungsten, tungsten oxide, iron oxide, titanium dioxide, silicon dioxide, and talc, and the acoustic impedance matching layer has a thickness of a quarter of a wavelength of an ultrasonic wave therethrough.

19. A method for manufacturing a detection panel, comprising:

forming a pattern comprising an upper electrode layer on a touch base substrate;

forming a piezoelectric material layer on the pattern comprising the upper electrode layer; and forming a conductive backing layer on the piezoelectric material layer, wherein the conductive backing layer comprises a plurality of noise elimination members, and each of the noise elimination members has a dimension in a direction parallel to the detection panel that gradually decreases in a direction distal to the piezoelectric material layer.

* * * * *